US010310961B1

(12) United States Patent
Rabasco et al.

(10) Patent No.: US 10,310,961 B1
(45) Date of Patent: Jun. 4, 2019

(54) COGNITIVE DYNAMIC SCRIPT LANGUAGE BUILDER

(71) Applicant: INTERNATIONAL BUSINESS MACHINES CORPORATION, Armonk, NY (US)

(72) Inventors: Ralph A. Rabasco, LaGrange, NY (US); Christopher B. Van Wagner, Red Hook, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/825,220

(22) Filed: Nov. 29, 2017

(51) Int. Cl.
*G06F 9/44* (2018.01)
*G06F 11/36* (2006.01)
*G06F 15/18* (2006.01)
*G06F 8/30* (2018.01)
*G06N 20/00* (2019.01)
*G06F 17/30* (2006.01)
*G06F 16/23* (2019.01)

(52) U.S. Cl.
CPC ............ *G06F 11/3624* (2013.01); *G06F 8/31* (2013.01); *G06F 11/3664* (2013.01); *G06F 15/18* (2013.01); *G06N 20/00* (2019.01); *G06F 16/23* (2019.01); *G06F 17/30345* (2013.01)

(58) Field of Classification Search
CPC .................................................. G06F 11/3624
USPC .................................. 717/120–130, 140–141
See application file for complete search history.

(56) References Cited

U.S. PATENT DOCUMENTS

| 4,974,191 | A | | 11/1990 | Amirghodsi et al. |
| 5,475,843 | A | * | 12/1995 | Halviatti ............. G06F 9/45512 717/108 |
| 5,812,850 | A | * | 9/1998 | Wimble .............. G06F 11/3624 714/E11.209 |
| 6,430,708 | B1 | | 8/2002 | Evans |
| 6,662,355 | B1 | | 12/2003 | Caswell et al. |
| 6,851,115 | B1 | | 2/2005 | Cheyer et al. |

(Continued)

FOREIGN PATENT DOCUMENTS

JP 2016081126 A 5/2016

OTHER PUBLICATIONS

Daneil et al, "Automated GUI Refactoring and Test Script Repair (Position Paper)", ACM, pp. 38-41, 2011 (Year: 2011).*

(Continued)

*Primary Examiner* — Anil Khatri
(74) *Attorney, Agent, or Firm* — Erik K. Johnson (57) ABSTRACT

An embodiment of the invention may include a method, computer program product and computer system for updating a script of scripting language. The embodiment may include a computing device that receives an error message from the script operating in a run-time environment. The embodiment may include a computing device that determines a cause of the error message, wherein the cause of the error message is an erroneous segment of code of the script. The embodiment may include a computing device that determines a solution to the error message, wherein the solution to the error message is a replacement segment of code for the erroneous segment of code. The embodiment may include a computing device that creates a new script based on the replacement segment of code. The embodiment may include a computing device that operates the new script in the run-time environment.

17 Claims, 5 Drawing Sheets

(56) References Cited

U.S. PATENT DOCUMENTS

| | | | | |
|---|---|---|---|---|
| 7,343,588 B2* | 3/2008 | Bates | ............... | G06F 11/362 |
| | | | | 714/E11.207 |
| 7,818,729 B1* | 10/2010 | Plum | ............... | G06F 11/3624 |
| | | | | 717/140 |
| 7,886,273 B2* | 2/2011 | Hinchey | ............... | G06F 8/10 |
| | | | | 717/124 |
| 7,895,576 B2* | 2/2011 | Chang | ............... | G06F 11/3684 |
| | | | | 704/8 |
| 7,979,848 B2* | 7/2011 | Hinchey | ............... | G06F 8/10 |
| | | | | 717/127 |
| 7,992,134 B2* | 8/2011 | Hinchey | ............... | G06F 8/10 |
| | | | | 717/126 |
| 8,078,019 B2* | 12/2011 | Cohen | ............... | G02B 6/2713 |
| | | | | 385/11 |
| 8,191,044 B1* | 5/2012 | Berlik | ............... | G06F 11/3672 |
| | | | | 717/102 |
| 8,209,667 B2* | 6/2012 | Eisner | ............... | G06F 9/44589 |
| | | | | 714/38.1 |
| 8,271,457 B2 | 9/2012 | Vos et al. | | |
| 8,332,820 B2* | 12/2012 | Hummel, Jr. | ....... | G06F 11/3672 |
| | | | | 717/124 |
| 8,381,187 B2 | 2/2013 | Fowler, II et al. | | |
| 8,566,792 B2* | 10/2013 | Chasman | ............ | G06F 11/3604 |
| | | | | 707/999.004 |
| 8,589,980 B2* | 11/2013 | Tapiola | ............. | H04N 21/4122 |
| | | | | 725/51 |
| 8,719,792 B2 | 5/2014 | Chauvet et al. | | |
| 9,244,814 B1* | 1/2016 | Chazan | ............... | G06F 11/3692 |
| 9,448,769 B1* | 9/2016 | Katoch | ............... | G06F 8/30 |
| 9,703,681 B2* | 7/2017 | Taylor | ............... | G06F 11/362 |
| 2010/0251024 A1 | 9/2010 | Gonzales | | |
| 2016/0070698 A1 | 3/2016 | Cable et al. | | |

OTHER PUBLICATIONS

Lu et al, "Dynamic Enforcement of Determinism in a Parallel Scripting Language", ACM, pp. 519-529, 2014 (Year: 2014).*

Li et al, "An Efficient Code Update Scheme for DSP Applications in Mobile Embedded Systems", ACM, pp. 105-114, 2010 (Year: 2010).*

Kim et al, "Remote Progressive Firmware Update for Flash-Based Networked Embedded Systems", ACM, pp. 407-412, 2009 (Year: 2009).*

Jang et al, "Points-to Analysis for JavaScript", ACM, pp. 1930-1937, 2009 (Year: 2009).*

Suzuki et al, "An XML Document Transformation Algorithm Inferred from an Edit Script between DTDs", ACM, pp. 175-184, 2008 (Year: 2008).*

Anonymous, "Automatic Categorization of IT Infrastructure Service Management Data Using Natural Language Processing and Machine Learning", An IP.Com Prior Art Database Technical Disclosure, IP.Com No. IPCOM000245200D, Feb. 18, 2016, 7 Pages.

Anonymous, "Method and Apparatus for Trust, Vicinity, Natural Language Processing Based Collaboration Leveraging Insights-Based Cognitive Models", An IP.Com Prior Art Database Technical Disclosure, IP.Com No. IPCOM000241376D, Apr. 21, 2015, 5 Pages, http://ip.com/IPCOM/000241376.

Banavar, "Learning to Trust Artificial Intelligence Systems: Accountability, Compliance and Ethics in the Age of Smart Machines", Sep. 2016, 9 Pages, IBM Global Services, US.

* cited by examiner

```
                    301A
                    ~
      //++JOBNAME++  JOB ,,MSGLEVEL=(1,1),CLASS=A,MSGCLASS=H,NOTIFY=&SYS
      //            REGION=0M
      //**********************************************************
      //* BUILD THE CSI.
      //**********************************************************
      //DEFCSI    EXEC PGM=IDCAMS,REGION=0K   303A        305A
      //SYSPRINT  DD SYSOUT=*                  ~           ~
      //SEQCSI    DD DSN=MVSSTORE.PSL.++PRODVER++.++BLDSTRNG++.SEQCSI,
      //             DISP=SHR          303A
      //SYSIN     DD *                  ~
       DELETE 'MVSSTORE.PSL.++PRODVER++.CSI' CLUSTER PURGE SCRATCH
       SET MAXCC=0
       DEFINE CLUSTER(
           NAME(MVSSTORE.PSL.++PRODVER++.CSI) -
                                ~
                              303A
```

FIG. 3A

```
                    301B
                    ~
      //DB2CSIBU JOB ,,MSGLEVEL=(1,1),CLASS=A,MSGCLASS=H,NOTIFY
      //            REGION=0M
      //**********************************************************
      //* BUILD THE CSI.
      //**********************************************************
      //DEFCSI    EXEC PGM=IDCAMS,REGION=0K   303B        305B
      //SYSPRINT  DD SYSOUT=*                  ~           ~
      //SEQCSI    DD DSN=MVSSTORE.PSL.DB2C10.CV120216.SEQCSI,
      //             DISP=SHR          303B
      //SYSIN     DD *                  ~
       DELETE 'MVSSTORE.PSL.DB2C10.CSI' CLUSTER PURGE SCRATCH
       SET MAXCC=0
       DEFINE CLUSTER(
           NAME(MVSSTORE.PSL.DB2C10.CSI) -
                                ~
                              303B
```

COGNITIVE DYNAMIC SCRIPT LANGUAGE BUILDER

BACKGROUND

The present invention relates to script language deployment, and more specifically, to cognitively updating scrip languages.

A scripting or script language is a programming language that supports scripts: programs written for a special run-time environment that automate the execution of tasks that could alternatively be executed one-by-one by a human operator. Scripting languages are often interpreted (rather than compiled). Primitives are usually the elementary tasks or API calls, and the language allows them to be combined into more complex programs. Environments that can be automated through scripting include software applications, web pages within a web browser, the monikers of operating systems (OS), embedded systems, as well as numerous games. A scripting language can be viewed as a domain-specific language for a particular environment; in the case of scripting an application, this is also known as an extension language. Scripting languages are also sometimes referred to as very high-level programming languages, as they operate at a high level of abstraction, or as control languages, particularly for job control languages on mainframes.

Job Control Language (JCL) is a name for scripting languages used on IBM mainframe operating systems to instruct the system on how to run a batch job or start a subsystem. More specifically, the purpose of JCL is to say which programs to run, using which files or devices for input or output, and at times to also indicate under what conditions to skip a step.

BRIEF SUMMARY

An embodiment of the invention may include a method, computer program product and computer system for updating a script of scripting language. The embodiment may include a computing device that receives an error message from the script operating in a run-time environment. The embodiment may include a computing device that determines a cause of the error message, wherein the cause of the error message is an erroneous segment of code of the script. The embodiment may include a computing device that determines a solution to the error message, wherein the solution to the error message is a replacement segment of code for the erroneous segment of code. The embodiment may include a computing device that creates a new script based on the replacement segment of code. The embodiment may include a computing device that operates the new script in the run-time environment.

DETAILED DESCRIPTION

Embodiments of the present invention will now be described in detail with reference to the accompanying Figures.

Scripting languages are used as high-level language in order to issue batch commands to a system. For example, Job Control Language (JCL) on IBM zOS mainframes is used to initiate programs to run, and what files to run the programs with, in order to manage and initiate all of the commands throughout the system.

However, in a dynamic environment, file names, system parameters, and other human errors may require constant monitoring to ensure the proper batch operations are performed on the right files. Such monitoring can be labor intensive, and lead to system failures if not addressed. This increased expense may hinder the dynamic capabilities of the entire system, as version updates to a system file may require large amounts of time to implement due to the need to rewrite all of the batch operations for the system.

Figure 1:
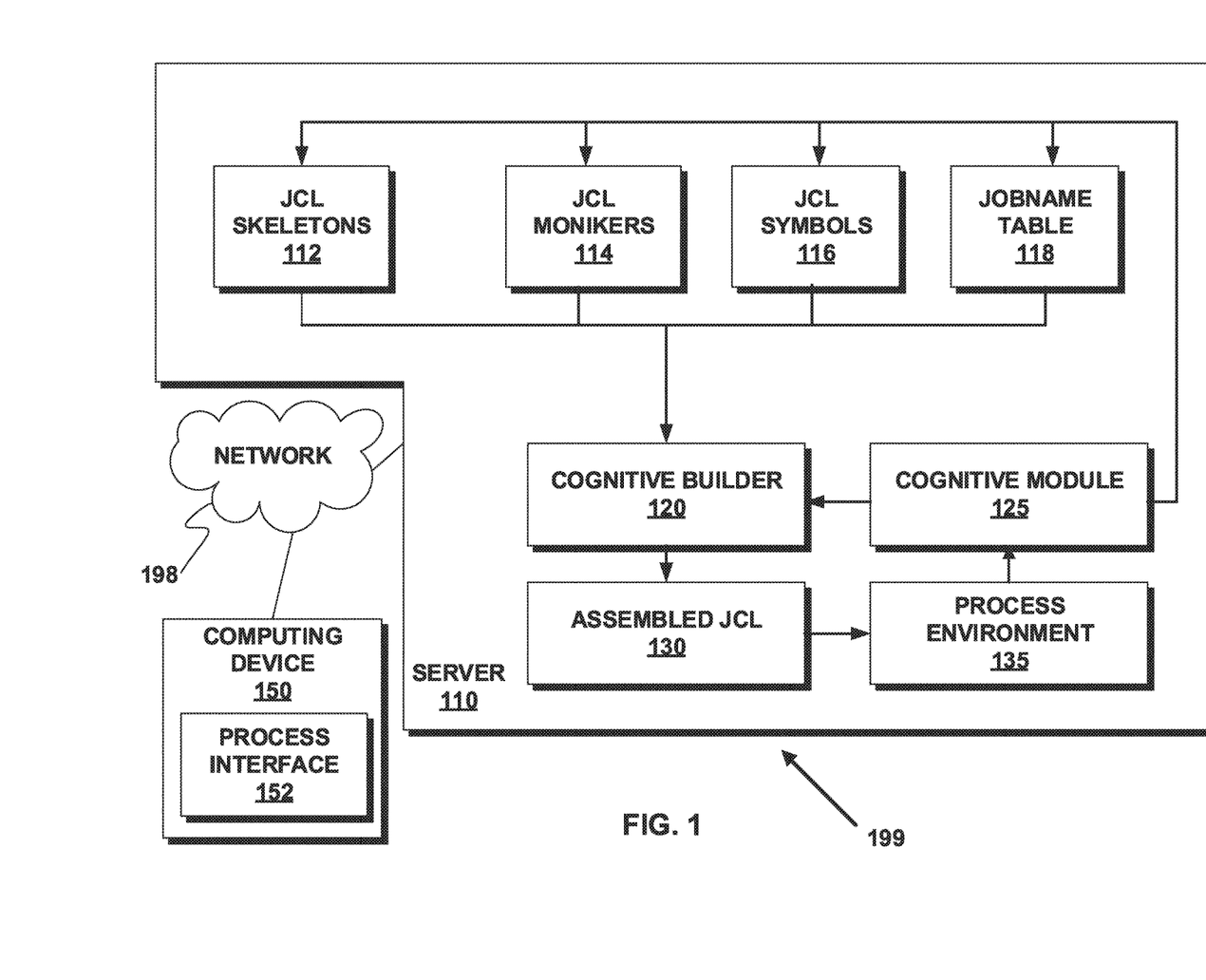
FIG. 1 illustrates a Cognitive Dynamic Script Building System, in accordance with an embodiment of the invention.

FIG. 1 illustrates Cognitive Dynamic Script Building System 199, in accordance with an embodiment of the invention. In an example embodiment, Cognitive Dynamic Script Building System 199 includes a server 110 and a computing device 150 interconnected via a network 198. By implementing Cognitive Dynamic Script Building System 199, a cognitive module 125 may monitor system performance, updates, and changes, and make dynamic changes to elements of the batch processes, or system code, that fix errors, or stop malicious activity by users, that may lead to failures in the system.

In the example embodiment, network 198 is the Internet, representing a worldwide collection of networks and gateways to support communications between devices connected to the Internet. Network 198 may include, for example, wired, wireless or fiber optic connections. In other embodiments, network 198 may be implemented as an intranet, a local area network (LAN), or a wide area network (WAN). In general, network 198 can be any combination of connections and protocols that will support communications between the server 110 and the computing device 150.

Computing device 150 may include process interface 152. Computing device 150 may be a desktop computer, a notebook, a laptop computer, a tablet computer, a handheld device, a smart-phone, a thin client, or any other electronic device or computing system capable of receiving and sending data to and from other computing devices such as server 110 via network 198. In an example embodiment, computing device 150 is a computing device that enables a user to interface with the programs and files located on server 110. Computing device 150 is described in more detail with reference to FIG. 4.

Process interface 152 is a is a program located on computing device 150 that allows a user to issue commands to, or receive feedback from, Cognitive Dynamic Script Building System 199. In one instance, the process interface 152 issues a command to initiate the Cognitive Dynamic Script Building System 199. In another instance, the process interface 152 may select different operations or programs to execute in the process environment 135, or receive feedback from the process environment 135. Additionally, process environment 135 may receive updates, or fixes, made by cognitive module 125.

Server 110 includes JCL skeletons 112, Symbolic Resolution Instructions 116, JCL Assembly Instructions 114, jobname resolution 118, cognitive builder 120, cognitive module 125, and assembled JCL 130 and process environment 135. In the example embodiment, server 110 is a server, or any other electronic device or computing system capable of receiving and sending data to and from computing device 150 via network 198, and managing mainframe operations of process environment 135. Although not shown, optionally, server 110 can comprise a cluster of servers executing the same software to collectively process the requests from multiple computing devices. Server 110 is described in more detail with reference to FIG. 4.

JCL skeletons 112 is a database containing the commands necessary to perform specific functions on the mainframe. The commands contain one or more command lines for performing a specific task, function, batch return or other operation that are written having a variable in place of a specific file or program name. A command line may contain one or more variables in place of specific file names, or parameters, that the command refers to. In an example embodiment, each JCL skeleton is a subroutine, or segment of code, that accomplishes a specific outcome as part of a larger job in the mainframe. Each JCL skeleton may be used across multiple different batch jobs.

JCL Monikers 114 is a database, or look-up table, containing monikers that outline the JCL skeletons necessary to accomplish a specific batch job. The monikers may be the ordered high-level operations necessary to achieve a batch job, and may be a ordered listing of calls to one or more skeletons from JCL skeletons 112, as well as any intervening command lines.

JCL symbols 116 is database, or look-up table, relating the variables contained in the command lines from JCL skeletons 112 into discrete values for use in an assembled JCL script. Symbolic Resolution Instructions 116 acts as a database, or look-up table, to input the specific names into JCL skeleton 112 to create suitable code for operation.

Jobname table 118 is a database containing the rules for constructing a jobname for each assembled JCL script, as well as the monikers, JCL skeletons, and variable values for the JCL builds under that jobname.

Cognitive builder 120 creates assembled JCL batch operations using the information contained in JCL skeletons 112, Symbolic Resolution Instructions 116, JCL Assembly Instructions 114, and jobname resolution 118. Cognitive builder 120 receives a build instruction to implement the dynamic variables for each batch job. The Cognitive builder 120 implements the necessary command skeleton, from JCL skeletons 112, into the moniker for a batch job contained in JCL Assembly Instructions 114. Cognitive builder 120 then inserts the current variable values contained in Symbolic Resolution Instructions 116 into the lines of command, and forms a JCL script.

Assembled JCL 130 is a set of commands that may be executed to perform a batch job, or start a subsystem in process environment 135. Each set of commands, or script, located in assembled JCL 130 is the result of the combination of the elements from JCL skeletons 112, Symbolic Resolution Instructions 116, JCL Assembly Instructions 114, jobname resolution 118 using cognitive builder 120.

Process environment 135 is the environment in which each script from assembled JCL 130 is executed. Each script may perform a specific action in process environment 135, which may be monitored by cognitive module 120. Additionally, process environment 135 may feedback errors, and the extent of those errors, to cognitive module 125, which may then be used to update JCL skeletons 112, Symbolic Resolution Instructions 116, JCL Assembly Instructions 114 in an attempt to eliminate said errors. Further, process environment may log the system parameters of the process environment 135, such as the batch jobs that have been run, errors associated with any batch jobs, any logged system file changes (e.g. file name changes, file deletions, file creations), and any logged system changes (e.g. hardware changes). Additionally, process environment 135 may contained other processes or functionalities that instruct the system when to operate each script from assembled JCL 130.

Cognitive module 125 updates JCL skeletons 112, Symbolic Resolution Instructions 116, JCL Assembly Instructions 114, jobname resolution 118 based on the results of assembling the content using cognitive builder 120, as well as results of executing assembled JCL scripts in process environment 135. Cognitive modules 125 may contain a cognitive error model and cognitive solution model. The cognitive error model and cognitive solution model may be machine learning algorithms that analyzes job logs, error logs, assembled JCL 130, and system and file changes to work in tandem to determine solutions to errors from running batch jobs in process environment 135.

Figure 2:
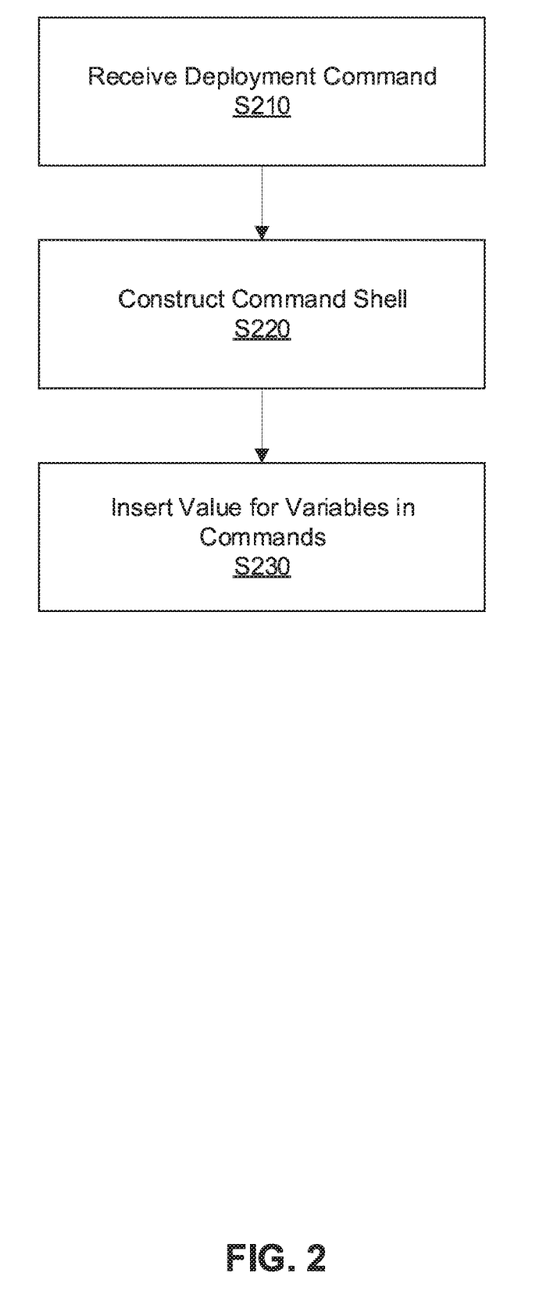
FIG. 2 is a flowchart illustrating the operations of the cognitive builder of FIG. 1, in accordance with an embodiment of the invention.

FIG. 2 is a flow chart illustrating of the cognitive builder 120. Referring to step S210, cognitive builder 120 receives a deployment command. The deployment command is the instruction to put together, or update, an assembled JCL script or scripts, based on a either the initiation of the Cognitive Dynamic Script Building System 199 via process interface 152, or alternatively based on an update by cognitive builder 125 to a component, such as a skeleton in JCL skeletons 112, a variable contained in Symbolic Resolution Instructions 116, a moniker contained in JCL Assembly Instructions 114.

Referring to step S220, cognitive builder 120 inserts the command skeleton, from JCL skeletons 112, into the moniker outlining the steps for a batch job contained in JCL Assembly Instructions 114. Additionally, cognitive builder 120 may resolve any syntax or context related issues during the insertion.

Referring to step S230, cognitive builder 120 inserts the current variable values contained in Symbolic Resolution Instructions 116, as well as the jobname from jobname resolution 118, into the lines of command, and forms a JCL script. Additionally, cognitive builder 120 may record the variables, skeletons and monikers used to create the batch job associated with the jobname in jobname resolution 118. As should be understood, the order of steps S220 and S230 is a matter of design choice, and could be performed in the order depicted, in the reverse order (i.e. S220 then S230), or simultaneously.

Figure 3A:
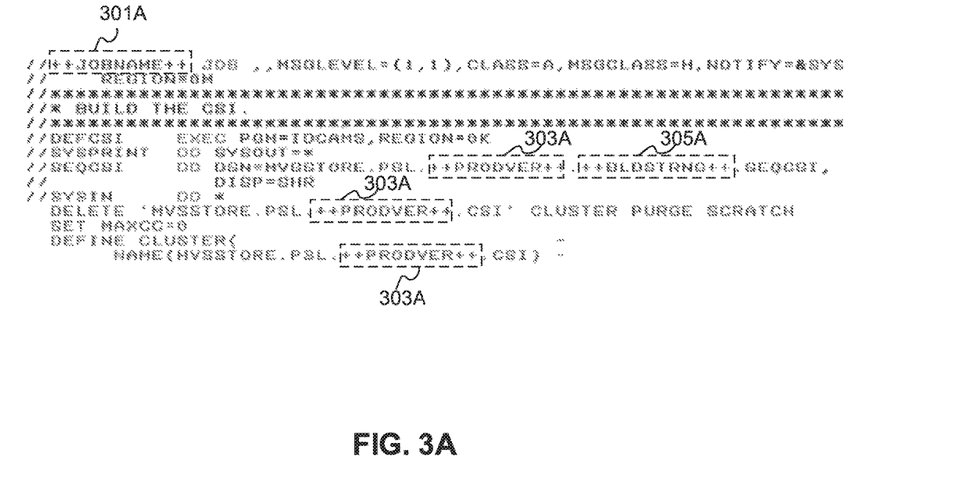
FIGS. 3A and 3B show an implementation of the method of FIG. 2, in accordance with an embodiment of the invention.
Figure 3B:
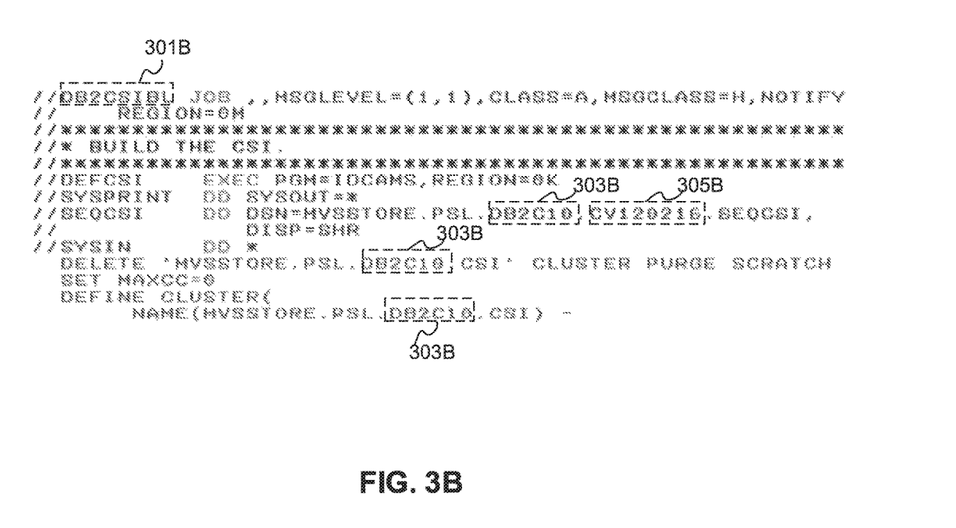

FIGS. 3A and 3B show lines of commands prior to, and following, step S230 of the above method. FIG. 3A depicts lines of commands containing a jobname placeholder 301A, a first variable name 303A and a second variable name 305A. Following step S230, cognitive builder 120 determines values for these variables, and inserts them into the code. In this example, cognitive builder returns DB2CSIBL as actual jobname 301B, DB2C10 as actual first variable name 303B, and CV120216 as actual second variable 305B.

Figure 4:
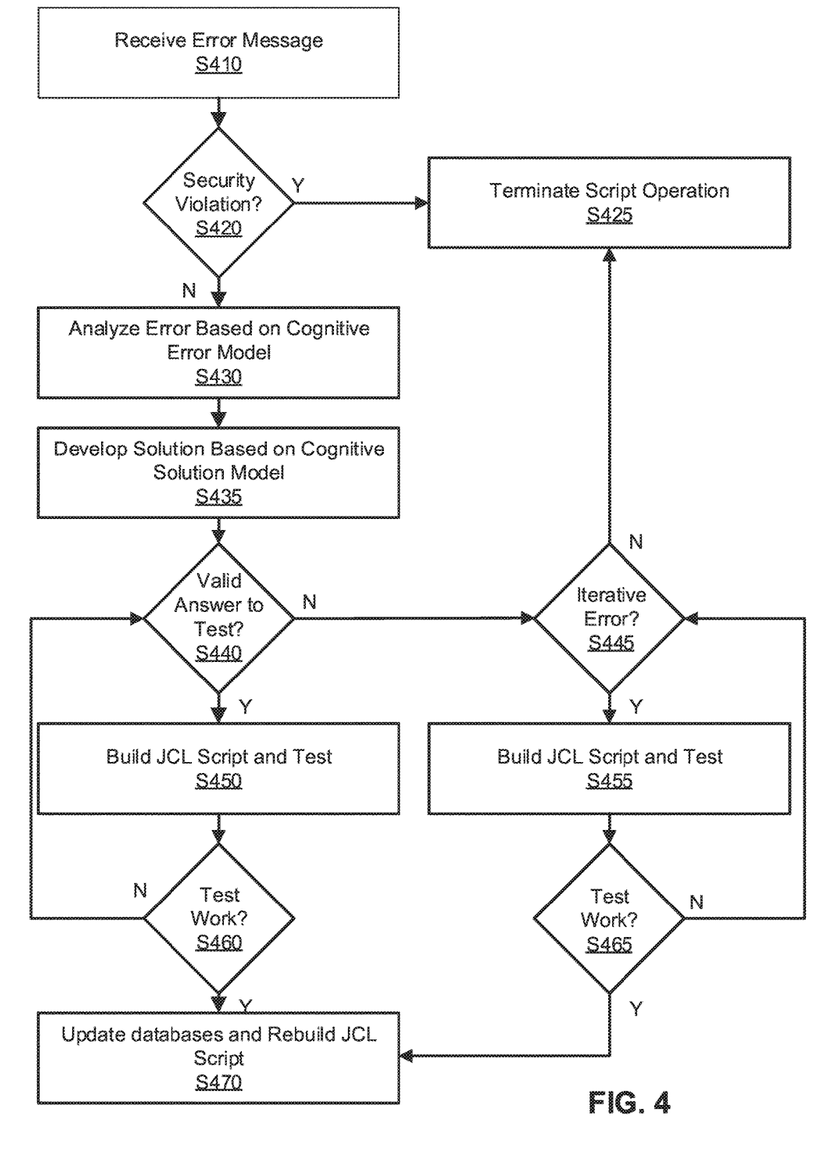
FIG. 4 is a flowchart illustrating the operations of the cognitive module of FIG. 1, in accordance with an embodiment of the invention.
Figure 5:
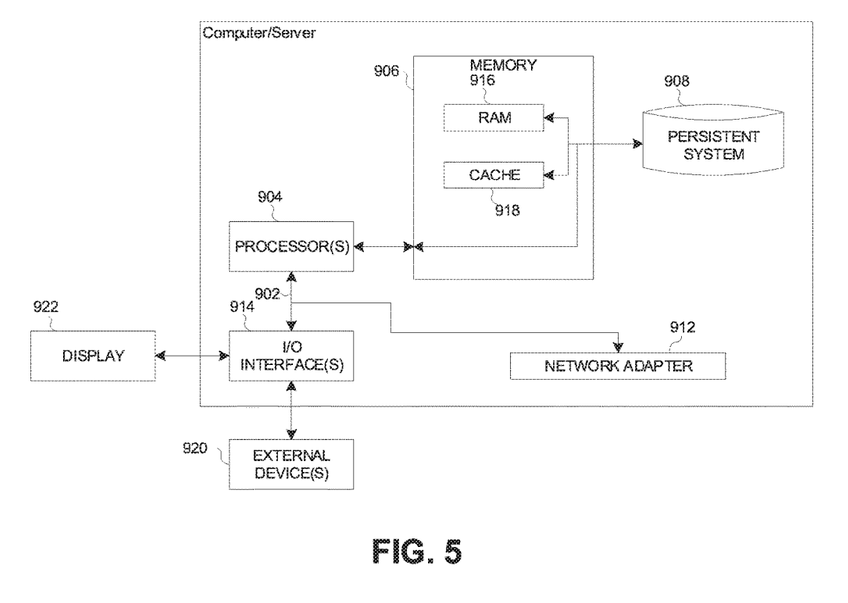
FIG. 5 is a block diagram depicting the hardware components of the Cognitive Dynamic Script Building System of FIG. 1, in accordance with an embodiment of the invention.

FIG. 4 is a flow chart illustrating of the cognitive module 125. Referring to step S410, cognitive module 125 receives an error message from process environment 135. The error message may contain an error code, an explanation of the error and a field for the error.

Referring to step S420, cognitive module 125 determines whether a security violation has occurred. Security violations may be determined by a set of system level rules, such as users that are able to perform a specific job or operation, or how often a user may be able to perform a specific job within a given amount of time (e.g. number of deletions within an hour). In one example, a violation may include a RACF violation. If a security violation occurs, cognitive module proceeds to step S425. If a security violation does not occur, cognitive module proceeds to step S430.

Referring to step S425, cognitive module terminates script operation, and sends a system level alert to process interface 152. Such alerts may notify a system administrator of failure in the process environment 135.

Referring to step S430, cognitive module 125 determines the cause of the error message, and a possible answer to solve the error message, based on an error model. The error model may be a machine learning algorithm, or rules engine, that enables cognitive module to determine the root cause of a system error. In embodiments in which the error model is created based on a machine leaning algorithm, the model may be created or updated during step S430. In such embodiments, the error model may be based on a supervised machine learning algorithm, the model may be trained using system logs (containing error messages) and script logs. In building the error model, the cognitive module 125 may compare two subsequent runs of a batch job, the first being a run containing an error, and the second being a successful run. The cognitive module 125 may analyze differences in the script for each batch job to determine what change in the script for each batch job created an error (and thus what the original cause of the error in the first script). In such an example, the "answer" to the training set is the script present in the first run, and not in the second. Additional embodiments of the error model may implement other system parameters for higher level correlations. Cognitive module 125 may analyze the error message to determine the cause of the error, based on the error model.

Referring to step S435, cognitive module 125 may determine possible solutions to the cause of the error determined in step S430 based on a solution model. The solution model may be a machine learning algorithm, or rules engine, that enables cognitive module to determine likely solutions to the determined cause of the error. In an embodiment in which the solution model is based on a machine learning algorithm, the model may be trained using system logs (containing error messages), script logs for all associated scripts from the system logs, any logged system file changes (e.g. file name changes, file deletions, file creations), and any logged system changes (addition or removal of hardware). In building the solution model, the cognitive module 125 may compare two subsequent runs of a batch job, the first being a run containing an error, and the second being a successful run. The cognitive module 125 may look at the newly inserted language into the script, and may use the script in the second run as the training "answer" to build a predictive solution model, and confidence score for the resulting answer. The cognitive module 125 may correlate the correction to the error to other system changes (e.g. change in a job class of an updated file led to the error, and the fix was to update the job class in the script), and score such changes based on a confidence of the algorithm in those solutions. The cognitive module 125 may then evaluate the error determined in step S430 for possible cognitive solutions.

Referring to step S440, cognitive module 125 determines if there are any valid cognitive solutions to test from step S435. In one embodiment, a valid cognitive solution may be any possible cognitive solution with a confidence score above a threshold level. In another embodiment, a valid cognitive solution may be the top Nth number of cognitive solutions. Further, combinations of the above may be performed. If cognitive module determines that there are valid cognitive solutions to test, cognitive module 125 proceeds to step S450. If cognitive module 125 determines there are no valid cognitive solutions to test, cognitive module proceeds to step S445.

Referring to step S450, cognitive module 125 builds a test script, using cognitive builder 120, introduction the cognitive solution into the test script. Cognitive module 125 may then run the test script in process environment 135, or alternatively in test environment build to simulate process environment 135. Cognitive module 125 may record the test script, and result of the test, in a test log for process environment 135, which may be used in training cognitive module 125 in subsequent iterations. Referring to step S460, if the test is successful cognitive module 125 proceeds to step S470. If the test is not successful, cognitive module 125 proceeds to step S440 to run subsequent tests (if possible).

Referring to step S470, cognitive module 125 updates the appropriate database(s), JCL skeleton 112, JCL Monikers 114 and/or JCL Symbols 116, and issues a command to cognitive builder 120 to rebuild the associated JCL scripts.

Referring to step S445, cognitive module 125 determines if there are any valid iterative solutions to test from step S435. An iterative solution may be determined when the error determined in step S430 has a defined set of solutions. For example, an iterative solution may be available for class type errors. Additionally, an iterative solution may be available in instances where there is a naming convention for variable names or file names. Additionally, a counter may be implemented with respect to determining the iterative solution. In such instances, the iterative solution may only be determined a valid iterative solution to test if the counter does not exceed a threshold value. If cognitive module 125 determines that there are valid iterative solutions to test, cognitive module 125 proceeds to step S450. If cognitive module 125 determines there are no valid iterative solutions to test, cognitive module proceeds to step S445.

Referring to step S455, cognitive module 125 builds a test script, using cognitive builder 120, introduction the iterative solution into the test script. Cognitive module 125 may then run the test script in process environment 135, or alternatively in test environment build to simulate process environment 135. Cognitive module 125 may record the test script, and result of the test, in a test log for process environment 135, which may be used in training cognitive module 125 in subsequent iterations. Referring to step S465, if the test is successful cognitive module 125 proceeds to step S470. If the test is not successful, cognitive module 125 proceeds to step S445 to run subsequent tests (if possible).

With reference to the above, a Cognitive Dynamic Script Building System 199 exists in which a user may initiate the process environment 135 without additional input to maintain proper performance. Cognitive module 125 of Cognitive Dynamic Script Building System 199 may monitor the process environment 135 for system errors, and then determine solutions to the system errors based on the cognitive models. The cognitive module 125 may update JCL skeletons 112, JCL monikers 114, JCL symbols 116 and jobname table 118 based on the determined solutions, and initiate new builds of JCL scripts by cognitive builder 120. These scripts may be contained in assembled JCL 130, and used in process environment 135. Additionally, while the above system is described in a JCL environment, the system may operate with other scripting languages.

FIG. 3 depicts a block diagram of components of server 110 and computing device 150, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server 110 and computing device 150 include communications fabric 902, which provides communications between computer processor(s) 904, memory 906, persistent storage 908, communications unit 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The programs/files JCL skeletons 112, JCL monikers 114, JCL symbols 116, Jobname table 118, cognitive builder 120, cognitive module 125, assembled JCL 130, and process environment 135 in server 110; and process interface 152 in computing device 150 are stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Communications unit 912, in these examples, provides for communications with other data processing systems or devices. In these examples, communications unit 912 includes one or more network interface cards. Communications unit 912 may provide communications through the use of either or both physical and wireless communications links. The programs/files JCL skeletons 112, JCL monikers 114, JCL symbols 116, Jobname table 118, cognitive builder 120, cognitive module 125, assembled JCL 130, and process environment 135 in server 110; and process interface 152 in computing device 150 may be downloaded to persistent storage 908 through communications unit 912.

I/O interface(s) 914 allows for input and output of data with other devices that may be connected to server 110 and social media computing device 150. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., the programs/files JCL skeletons 112, JCL monikers 114, JCL symbols 116, Jobname table 118, cognitive builder 120, cognitive module 125, assembled JCL 130, and process environment 135 in server 110; and process interface 152 in computing device 150, can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A computer-implemented method for dynamically updating a script, the method comprising:
   receiving an error message from the script operating in a run-time environment;
   determining a cause of the error message, wherein the cause of the error message is an erroneous segment of code of the script;
   determining a solution to the error message, wherein the solution to the error message is a replacement segment of code for the erroneous segment of code;
   creating a new script based on the replacement segment of code, wherein creating the new script based on the replacement segment of code comprises:
   updating a database based on the determined segment of code, wherein the database is comprising of a type of code selected from the group consisting of:
   a skeleton database, a moniker database, and a symbol database;

inserting one or more skeletons from the skeleton database into a moniker from the moniker database: and inserting one or more variables from the variable database into the one or more skeletons to create the new script, wherein at least one of the one or more skeletons, the one or more variables and the monikers contain the determined segment of code; and executing the new script in the run-time environment.

2. The method of claim 1, wherein determining the cause of the error comprises analyzing the error message with an error model, and wherein the error model is a supervised learning algorithm.

3. The method of claim 1, wherein determining the solution to the error message comprises analyzing the erroneous segment of code with a solution model, and wherein the solution model is a supervised learning algorithm.

4. The method of claim 1, wherein determining the solution to the error message comprises iteratively trying a set of rules to replace the erroneous segment of code.

5. The method of claim 4, wherein the set of rules comprises a naming convention.

6. The method of claim 1, wherein a coding language of the script is Job Control Language.

7. A computer program product for dynamically updating a script, the computer program product comprising one or more computer-readable storage devices and program instructions stored on at least one of the one or more computer-readable storage devices, the program instructions comprising:

receiving an error message from the script operating in a run-time environment;

determining a cause of the error message, wherein the cause of the error message is an erroneous segment of code of the script;

determining a solution to the error message, wherein the solution to the error message is a replacement segment of code for the erroneous segment of code;

creating a new script based on the replacement segment of code, wherein creating the new script based on the replacement segment of code comprises:

updating a database based on the determined segment of code, wherein the database is comprising of a type of code selected from the group consisting of: a skeleton database, a moniker database, and a symbol database:

inserting one or more skeletons from the skeleton database into a moniker from the moniker database: and inserting one or more variables from the variable database into the one or more skeletons to create the new script, wherein at least one of the one or more skeletons, the one or more variables and the monikers contain the determined segment of code; and executing the new script in the run-time environment.

8. The computer program product of claim 7, wherein determining the cause of the error comprises analyzing the error message with an error model, and wherein the error model is a supervised learning algorithm.

9. The computer program product of claim 7, wherein determining the solution to the error message comprises analyzing the erroneous segment of code with a solution model, and wherein the solution model is a supervised learning algorithm.

10. The computer program product of claim 7, wherein determining the solution to the error message comprises iteratively trying a set of rules to replace the erroneous segment of code.

11. The computer program product of claim 10, wherein the set of rules comprises a naming convention.

12. The computer program product of claim 7, wherein a coding language of the script is Job Control Language.

13. A computer system for dynamically updating a script, the computer system comprising one or more processors, one or more computer-readable memories, one or more computer-readable tangible storage devices, and program instructions stored on at least one of the one or more storage devices for execution by at least one of the one or more processors via at least one of the one or more memories, the program instructions comprising:

receiving an error message from the script operating in a run-time environment;

determining a cause of the error message, wherein the cause of the error message is an erroneous segment of code of the script;

determining a solution to the error message, wherein the solution to the error message is a replacement segment of code for the erroneous segment of code;

creating a new script based on the replacement segment of code, wherein creating the new script based on the replacement segment of code comprises:

updating a database based on the determined segment of code, wherein the database is comprising of a type of code selected from the group consisting of: a skeleton database, a moniker database, and a symbol database;

inserting one or more skeletons from the skeleton database into a moniker from the moniker database; and inserting one or more variables from the variable database into the one or more skeletons to create the new script, wherein at least one of the one or more skeletons, the one or more variables and the monikers contain the determined segment of code; and executing the new script in the run-time environment.

14. The system of claim 13, wherein determining the cause of the error comprises analyzing the error message with an error model, and wherein the error model is a supervised learning algorithm.

15. The system of claim 13, wherein determining the solution to the error message comprises analyzing the erroneous segment of code with a solution model, and wherein the solution model is a supervised learning algorithm.

16. The system of claim 13, wherein determining the solution to the error message comprises iteratively trying a set of rules to replace the erroneous segment of code.

17. The system of claim 16, wherein the set of rules comprises a naming convention.

* * * * *